United States Patent [19]

Heintz

[11] 3,955,437
[45] May 11, 1976

[54] TRANSMISSION CONTROL MECHANISM
[75] Inventor: Herman Heintz, Livonia, Mich.
[73] Assignee: Massey-Ferguson Inc., Detroit, Mich.
[22] Filed: Nov. 15, 1974
[21] Appl. No.: 524,018

[52] U.S. Cl. .................................. 74/473 R; 74/491
[51] Int. Cl.² ............................................ G05G 9/12
[58] Field of Search ................ 74/473 R, 475, 476, 74/477, 491

[56] References Cited
UNITED STATES PATENTS

| 2,221,976 | 11/1940 | Kurtz | 74/473 R |
| 2,531,701 | 11/1950 | Price | 74/745 |
| 2,694,943 | 11/1954 | Brumbaugh | 74/473 R |
| 3,242,757 | 3/1966 | Winkler et al. | 74/473 R |
| 3,645,145 | 2/1972 | Galas | 74/473 R |
| 3,707,094 | 12/1972 | Herbenar | 74/473 R |

FOREIGN PATENTS OR APPLICATIONS

| 531,421 | 10/1921 | France | 74/473 R |

Primary Examiner—Allan D. Herrmann
Attorney, Agent, or Firm—Thomas P. Lewandowski

[57]  ABSTRACT

Two transmission shift levers are pivotally movable, one universally and the other about a single axis, by respective control members operative thereon through concentric shafts, the shaft associated with the universally pivotable lever being axially slidable relative to the shaft associated with the other lever in response to translational movement of its control member.

12 Claims, 5 Drawing Figures 3,955,437

TRANSMISSION CONTROL MECHANISM

BACKGROUND OF THE INVENTION

This invention relates to controls for transmissions and like mechanisms in which shift changes between selected operating conditions are actuated by pivotally mounted levers, and particularly those employing such a lever having universal pivotal movement to accommodate rocking thereof in a multiplicity of different directions or planes.

Many agricultural and industrial type machines include a transmission whose gear settings are actuated by a universally pivotable lever which must be manipulated in different planes through suitable linkage under the control of the operator from a station somewhat remote from the transmission. It is also frequently desired to incorporate therewith either a second transmission in series with the first for modifying the speed ratios obtainable, or a power take-off device, and to closely associate the operator's control thereof with the control of the first transmission.

SUMMARY OF THE INVENTION

The invention has particular advantage in applications requiring both a control for selecting between a first series of shift settings by manipulation of such a universally pivoted actuating lever, and selecting between another series of shift settings by pivotally swinging a second such lever about a fixed axis. In its broadest aspect, however, the control of such a universally pivotal acutating lever is carried out in accordance with the invention by suitably supporting a shaft for both axial rotation and translational movement along its axis, and providing both a connection between the shaft and the lever for transmitting to the lever both rotational and translational movements of the shaft and an operating handle for directly rotating and axially moving the shaft. In applications requiring the second series of shift settings a second shaft is employed which is supported for axial rotation only, and is provided with an operating handle and a connection to the second lever for pivoting the latter in response to rotation of the second shaft. Preferably such second shaft is arranged in coaxial and mutual journaling relation with the first shaft.

In the prior art U.S. Pat. No. 3,274,842 a transmission control shaft is shown which has both axial rotation and translational movement, but the shift actuating means and its connection to the shaft are entirely different. Also, U.S. Pat. Nos. 2,854,088 and 3,500,697 disclose axial rotation and translation of shifter shafts, but employ therefor numerous links, bell cranks and associated hardware which my invention makes unnecessary.

A better understanding of my invention and its advantages over all such prior art will be better understood from the following description of the preferred embodiment, selected for illustration, having reference to the drawings, wherein:

DESCRIPTION OF PREFERRED EMBODIMENT

Figure 1:
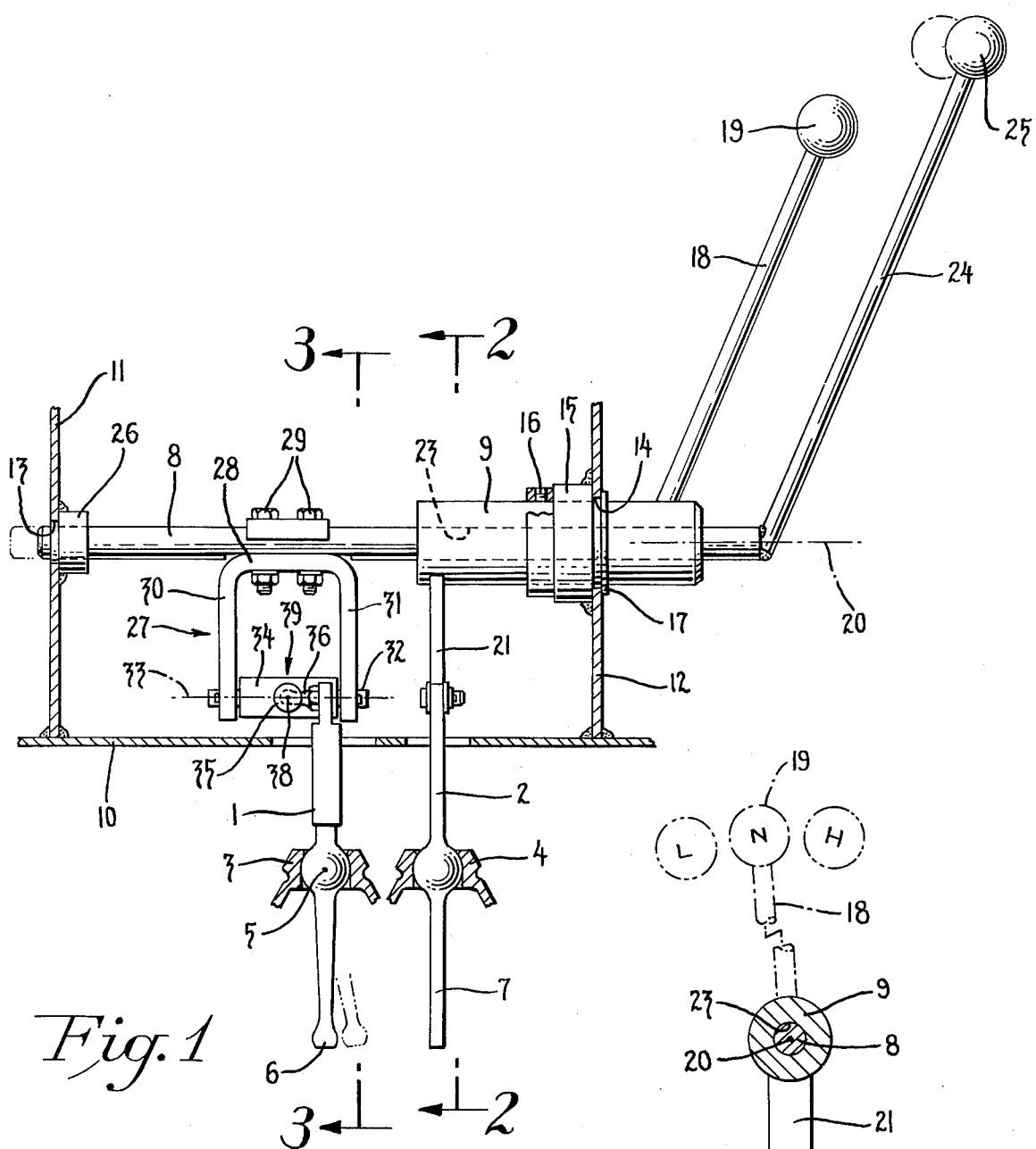
FIG. 1 is a side elevational view of a control mechanism constructed in accordance with the invention, with portions thereof cut away and shown in section.

Referring now to the drawings, and first to FIG. 1, two shift actuating levers 1 and 2 are shown which are pivotally mounted in fixed bearings 3 and 4, respectively. It should be understood that the bearing 3 is mounted on or forms part of the housing of a transmission gearbox (not shown) and that the bearing 4 is likewise associated with the housing of a second transmission or accessory control device (not shown). The actuating lever 1 is universally pivotable about the point 5 within the bearing 3 so that its lower end 6 may be moved laterally from its solid line position to either of the dotted line positions shown in FIG. 1, as well as from its solid line position numbered "N" to either of the dotted line positions numbered "1", "2", "3", shown in FIG. 3. Although the bearing 4 would also accommodate universal pivotal movement of the other actuator lever 2, in the arrangement employed this lever 2 has pivotal movement only about a single axis for movement of the lower end 7 of the lever between its solid position designated "N" and its two dotted line positions "L" and "H" shown in FIG. 2.

Such movements of the actuator levers 1 and 2 are responsive to axial rotation and axial shifting or translation of a first shaft 8, and axial rotation of a second shaft 9. As shown in FIG. 1, suitable supporting means accommodating such movements of the shafts 8 and 9 include a fixed bracket consisting of a base plate 10 to which are rigidly fixed, as by welding, two upright wall-like supports 11 and 12. These supports have aligned apertures 13 and 14, respectively, the aperture 14 being substantially larger than the aperture 13 and having journaled therein a bearing sleeve 15 closely embracing the larger shaft 9 and secured for rotation therewith as by a setscrew 16. The bearing 15 rotatably abuts the inner surface of support 12 and is held against axial displacement in the aperture 14 as by a flange 17 which abuts the outer surface of the support 12. The shaft 9 extends through the support 12, and rigidly connected to its outer end is an operator's control member in the form of a lever 18 fitted with a knob 19. Thus, movement of the knob laterally, as viewed in FIG. 2, causes the shaft 9 to rotate about its axis 20. An arm 21 depending from the shaft 9 has its lower end pivotally connected to one end of a link 22 whose other end is pivotally connected to the upper end of the actuator lever 2. Thus pivotal movement of the lever 2 between the various shift settings L, N, H (FIG. 2) is responsive to axial rotation of the shaft 9 by the operator's manipulation of the control lever 18 and knob 19.

Figure 3:
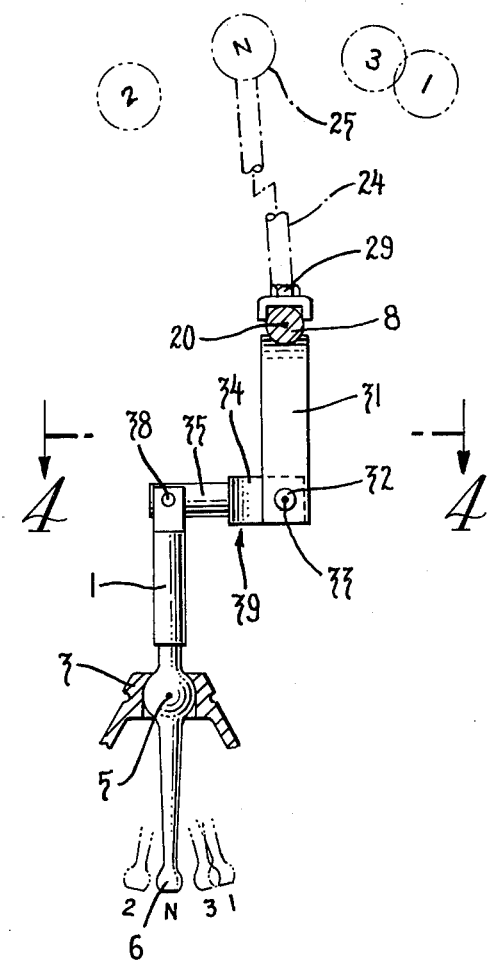
Figure 4:
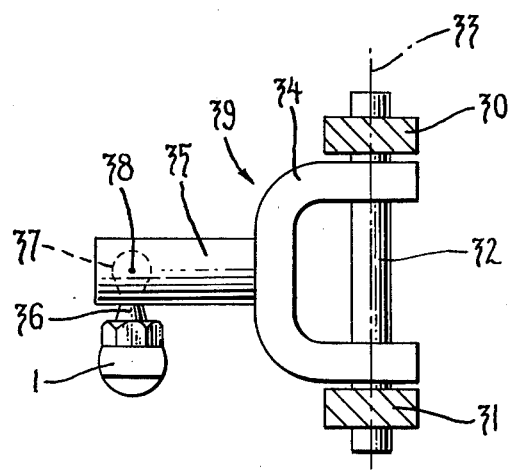
FIG. 4 is a sectional view taken along the line 4—4 of FIG. 3.

The shaft 8 is rotatably journaled and slidably guided in a bore 23 which extends through the shaft 9 concentrically of the axis 20, so that both these shafts are mutually supporting. Rigidly connected to the one end of shaft 8 is a second operator's control member in the form of a lever 24 with a hand knob 25. At its opposite end the shaft 8 extends through the aperture 13 in the support 11. A bearing 26, secured to the support 11, journals that end of shaft 8 for axial rotation and sliding movement. Such axial sliding and rotational movements of the shaft 8 are transmitted to the upper end of the actuator lever 1 by a connection designated generally by the numeral 27. As shown, this connection includes a first element in the form of a U-shaped bracket having its base portion 28 rigidly secured as by bolting 29 to the shaft 8, and two depending arms 30 and 31. A pin 32 extending through both the arms 30 and 31 defines a second axis 33, parallel with the axis 20, about which a second element in the form of a clevis 39 is pivotable. This second element includes a yoke portion 34, best illustrated in FIG. 4, through which the pin 32 also extends, and a shank portion 35. A stud 36, rigidly connected to the upper end of the actuator lever 1, has a part spherical end 37 socketed in the shank portion 35 for universal pivotal movement about the fixed point 38 thereon. Thus, movement of the operator's control knob 25 laterally in either direction from its solid line position shown in FIG. 1 causes the shaft 8 to slide longitudinally within the shaft 9 and bearing 26, causing concurrent translational movement of the bracket arms 30 and 31, as well as the yoke and shank portions 34, 35, with resultant pivotal movement of the actuator lever 1 between its solid line and dotted line positions shown in FIG. 1. Then at either extreme axial position of the shaft 8 the operator may, be swinging the control lever 24 and knob 25 laterally as viewed in FIG. 3, cause the actuator lever 1 to pivot about an axis perpendicular to the axis about which it pivoted during such translational movement.

Figure 2:
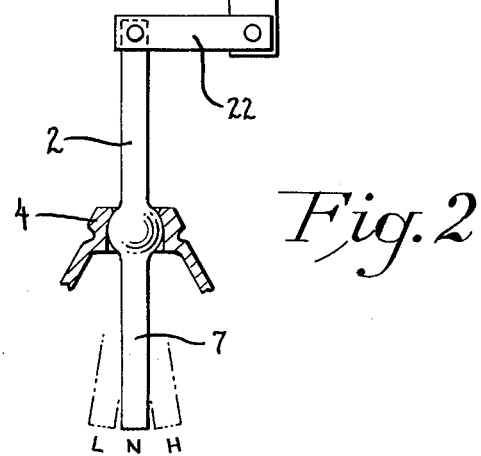
FIGS. 2 and 3 are sectional views taken substantially along the lines 2—2 and 3—3, respectively, of FIG. 1.
Figure 5:
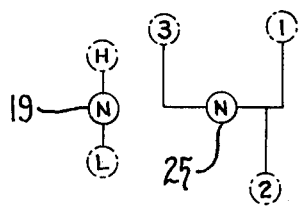
FIG. 5 is a diagrammatic illustration of the various shift settings obtainable with the mechanism of FIGS. 1–4.

With reference to FIG. 5, it will thus be apparent that movement of the control knob 19 from the neutral position N to the H or L positions will effect pivotal shifting of the actuator lever 2 to a corresponding position shown in FIG. 2. Also, by shifting the control knob 25 longitudinally of the axis 20 and then imparting rotary movement thereto about the axis 20 so that the knob assumes the position 3, the actuator lever 1 may be swung to either the shift positions 1 or 2, and conversely, when the control knob is shifted axially of the axis 20 to the opposite extreme position and then rotated about the axis 20, the actuator lever may be swung to the shift position 3.

In summary, levers 18 and 24 comprise first and second control levers interconnected with first and second shift actuating levers 2 and 1, respectively, by shift mechanism 8, 9, 21, 27 etc. The shift mechanism is operable to (1) cause the first shift actuating lever to move in a first shifting plane (the plane of FIG. 2) in response to corresponding movement of control lever 18 in a first control plane, (2) cause the second shift actuating lever 1 to move in a second shifting plane in response to corresponding movement of the second control lever 24 in a second control plane, and (3) cause the second shift actuating lever 1 to move in a third shifting plane in response to corresponding movement of the second control lever 24 in a third control plane. The second shifting plane is the plane of rotation of lever 1 shown in full lines in FIG. 1, and is a plane parallel to section lines 3—3 in FIG. 1. The second control plane is the plane of rotation of lever 24 in the position illustrated in full lines in FIG. 1, with the member 8, or motion transmitting rod 8, in a first axial position with respect to supports 11 and 12 shown in full lines in FIG. 1, while the third control plane is the plane of rotation of lever 24 in which member 8 is shifted to the left to a second axial position, which position is shown in phantom lines on the left hand side of support member 11 in FIG. 1. The third shifting plane is the plane of rotation of lever 1 when member 8 is in the latter referred to second axial position. The shift mechanism includes the motion transmitting rod 8 and motion transmitting sleeve 9.

The invention thus provides a compact and simply, but ruggedly, constructed control for a universally pivotable shift lever of a multi-speed transmission, with which may be combined a second control for another transmission or accessory unit having a shift actuating lever pivotable about a fixed axis. It will be appreciated that numerous minor variations in the parts and their assembly as described and shown may be made without departing from the spirit and scope of the invention as hereinafter claimed.

The embodiments of the present invention in which an exclusive property or privilege is claimed are defined as follows:

1. A control apparatus for transmissions and the like comprising a shift actuator lever universally pivotable about a fixed point, a movable control shaft having a longitudinal axis and a connection, said connection including a first element fixed to said shaft and a second element connected to said first element for translational movement with said first element and pivotal movement relative to said first element about an axis parallel to said shaft axis, said lever being secured to said second element for universal pivotal movement about a fixed point on said second element in response to said translational and pivotal movements of said second element.

2. The apparatus of claim 1 wherein said first element includes a pair of arms extending from said shaft, said second element being in the form of a clevis having a yoke portion pivotally connected to said arms and a shank portion extending from said yoke portion, one of said shank portion and lever having a stud extending therefrom and terminating in a partspherical end socketed for universal pivotal movement in the other.

3. The apparatus of claim 1 wherein said supporting means includes a second shaft rotatable about said axis, a second control member operative to rotate said second shaft about said axis and including a second shift actuator lever pivotal about a second axis in response to rotation of said second shaft about said shaft axis.

4. The apparatus of claim 3 wherein one of said shafts has a bore rotatably and slidably guiding the other of said shafts.

5. The apparatus of claim 3 wherein said connection comprises a first element fixed to said first named shaft and a second element connected to said first element for translational movement with said first element and pivotal movement relative to said first element about an axis parallel to said shaft axis, said lever being secured to said second element for universal pivotal movement about a fixed point on said second element in response to said translational and pivotal movements of said second element.

6. The apparatus of claim 5 wherein said first element includes a pair of arms extending from said first named shaft, said second element being in the form of a clevis having a yoke portion pivotally connected to said arms and a shank portion extending from said yoke portion, one of said shank portion and lever having a stud extending therefrom and terminating in a part-spherical end socketed for universal pivotal movement in the other.

7. Control apparatus for transmissions comprising: a first shift actuating member movable in a first shifting plane between at least one active position and neutral position; a second shift actuating member movable in a second shifting plane between at least one active position and neutral position, and a third shifting plane between at least one active position and neutral position; first control lever selectively movable in a first control plane, a second control lever selectively movable in a neutral control plane intersected by second and third control planes, said second control lever being selectively movable in said second and third control planes when moved to the respective intersections thereof with said neutral control plane; and shift mechanism interconnected with said control levers and shifting members operable to (1) cause said first shift actuating member to move in said first shifting plane in response to corresponding movement of said first control lever in said first control plane, (2) cause said second shift actuating member to move in said second shifting plane in response to corresponding movement of said second control lever in said second control plane with said first shift actuating member located at any selected position in said first shifting plane, and (3) cause said second shift actuating member to move in said third control plane in response to corresponding movement of said second control lever in said third control plane with said first shift actuating member located at any desired position in said first shifting plane.

8. Apparatus as claimed in claim 7 wherein said first control lever is supported for rotatable movement in said first control plane, and said second control lever is supported for rotatable movement in said second and third control planes and said second control lever is supported for movement along its axis of rotatable movement in said neutral control.

9. Apparatus as claimed in claim 8 wherein said shift mechanism includes a pair of coaxial rotatable motion transmitting members each of which is connected with one of said shifting members to transmit motion thereto in response to movement of said control lever.

10. Apparatus as claimed in claim 9 wherein one of said motion transmitting members is movable longitudinally between first and second axial position, said second shift actuating member being positioned in said second shifting plane when said one motion transmitting member is in said first axial position and being positioned in said third shifting plane when said one motion transmitting member is in said second axial position.

11. Apparatus as claimed in claim 10 wherein said second control lever is non-rotatably mounted on said one motion transmitting member, said one motion transmitting member being movable by said second control lever between said first and second axial positions in response to movement of said second control lever between said second and third control planes, respectively.

12. Apparatus as claimed in claim 11 wherein said first control lever is non-rotatably mounted in the other of said motion transmitting member to cause rotation of said other motion transmitting member in response to rotation of said first control lever.

* * * * *